United States Patent [19]

Halwes et al.

[11] 4,236,607
[45] Dec. 2, 1980

[54] VIBRATION SUPPRESSION SYSTEM

[75] Inventors: Dennis R. Halwes, Arlington; William A. Simmons, Fort Worth, both of Tex.

[73] Assignee: Textron, Inc., Providence, R.I.

[21] Appl. No.: 15,230

[22] Filed: Feb. 26, 1979

[51] Int. Cl.³ .............................................. F16F 9/10
[52] U.S. Cl. ..................................... 188/1 B; 248/562
[58] Field of Search ................. 188/1 B; 248/562, 636

[56] References Cited

U.S. PATENT DOCUMENTS

| 1,744,332 | 1/1930 | Paton et al. | 188/1 B X |
| 1,833,751 | 11/1931 | Kimball | 188/1 B X |
| 3,091,307 | 5/1963 | Tiedemann et al. | 188/1 B |
| 3,173,514 | 3/1965 | Tiedemann | 188/1 B |

FOREIGN PATENT DOCUMENTS

| 207035 | 5/1955 | Australia | 188/1 B |
| 920586 | 3/1963 | United Kingdom | 188/1 B |

*Primary Examiner*—Duane A. Reger
*Attorney, Agent, or Firm*—Richards, Harris & Medlock

[57] ABSTRACT

A vibration isolator (10) includes an outer housing (14) with an inner housing (16) supported for reciprocation therein. The inner housing (16) includes an elastomeric spring (32) supporting a sleeve or inner cylinder (30) with a passage (44) extending therethrough interconnecting a pair of spaced apart chambers (40,42) defined between the housings (14, 16). A tuning mass including liquid is disposed in the chambers (40,42) and the passage (44). The inner housing (16) functions as a piston to move the tuning mass through the inner cylinder (30) between the chambers (40,42) and generate amplified counter-inertial forces to cancel vibration.

20 Claims, 13 Drawing Figures

VIBRATION SUPPRESSION SYSTEM

TECHNICAL FIELD

The present invention relates to the cancellation of the oscillatory force transferred between a body which vibrates and a second body, attached to the first body, for which vibration is unwanted. More particularly, this invention concerns a novel device which employs a unique combination of hydraulics and dynamics to amplify the inertia of a high density liquid used as a tuning mass to substantially reduce the above mentioned oscillatory force transfer between the two bodies.

BACKGROUND ART

Vibration control is a common engineering problem. In some applications such as shaking, mixing, polishing, sifting, sanding and others too numerous to list, vibration is desirable and employed productively. In other applications vibration is not desired but is present through the dictates of physical laws governing the acceleration of mass produced by oscillatory forces. These involve the function and use of such items as motors, pumps, gear boxes, rotors, automatic weapons and other devices too numerous to list. In many of the above applications it is desirable to reduce or eliminate the oscillatory forces that produce vibration in other attached bodies or supporting structure. The attached body or supporting structure is generally referred to as the isolated body.

Various vibration control devices have been developed heretofore for the purpose of reducing the oscillatory force transfer between a vibrating body and a body for which vibration is unwanted. These vibration control devices are referred to as vibration isolators. Vibration isolators are broadly categorized as being an active vibration isolator or a passive vibration isolator. Devices of the two categories generally function to control the oscillatory force transfer between a vibrating body and an isolated body. One of the laws of Newtonian physics states that all unbalanced forces act to accelerate masses. This law is summed up in the familiar equation, $F=ma$, where: $F=$ the unbalanced force, $m=$ the mass of the object the force acts on, $a=$ the acceleration of the mass produced by the force. From this law it can be shown that the only methods by which vibration can be reduced is by producing a balancing force or by absorbing the force through acceleration of other masses.

By way of explanation, an active vibration isolator draws its energy and/or actuation from an independent and separate source of power that is not germane to the source of energy causing the oscillatory force which is to be controlled or cancelled. The active vibration isolator converts the energy from the external power source into forces which oppose or serve to cancel the oscillatory force transfer from the vibrating body to the isolated body. Additional controls, power and peripheral devices are required to operate an active vibration isolator at the proper amplitude, frequency and phase. Additional space is required for the necessary controls, the power source, the required peripheral equipment and the moving components of the active vibration control device itself. Although they function well, active vibration control devices are thus relatively complex and expensive, and are not weight or space efficient.

On the other hand, the design of a passive vibration control device avoids these undesirable and unwanted features. It is generally less complex in physical design, function and performance, but it is harder for it to maintain the proper amplitude frequency and phase. There are three basic types of passive isolators. They are: spring isolators, damping isolators, and mass isolators. Spring isolators reduce the oscillatory forces transmitted to the isolated body by introducing resilience between the vibrating body and the isolated body. Only at a vibration frequency that is high relative to the natural frequency of the system will a spring isolator perform well. This is because a spring transmits a force to the isolated body that is equal to the product of the spring rate of the spring times the relative motion between the two bodies. Since at high frequency this relative motion is small, the force transmitted is also small. The resilience allows the vibrating body to vibrate more thus its own mass absorbs the extra force. Damping isolators reduce the oscillatory forces by producing frictional or viscous forces (called damping) that are proportional to the relative velocity between the vibrating body and the isolated body. At low frequencies these damping forces are small because the relative velocity between the two bodies is small. Again the extra force is absorbed by greater acceleration of the vibrating body, but a damper has no static strength. Mass isolators reduce the oscillatory forces transmitted to the isolated body by simply introducing additional mass into the system; thus, the isolated body's acceleration is decreased. In addition to the three basic types of isolators, there are very many isolators that incorporate two or more of the basic types into one system. These include spring-dampers like the automotive suspension, mass-dampers like the fluid coupled flywheel, and spring-mass isolators like the frahum absorber, centrifugal, pendulum, and the Bifilar.

More recently, a spring-mass passive vibration isolator has been developed which employs inertial amplification and cancellation principles. These isolators use a principle of harmonic motion that the acceleration of a body is exactly out-of-phase with its displacement. Because of this law of physics an oscillatory force produced by a spring attached to the isolated body can be completely or partially cancelled by the forces produced by the acceleration of a third body's mass if its motion can be forced to be proportional to the displacement between the vibrating body and the isolated body. This forced motion has been accomplished successfully by various combinations of beams, levers and bearings to amplify the motion of the third mass (called the tuning mass) to large accelerations so that the force produced by its inertia is high enough to cancel the force produced by the spring. For example, vibration isolation through nodalization involves locating the isolated body attachment points along a flexible beam (the spring) coinciding with the locations of nodal or vibrational null points created by tuning masses on the ends of the beam. However, these systems, like the nodal beam, DAVI, and IRIS, are complex and require extra space for the large motions of the beams, levers and tuning mass.

Thus, there is a need for an improved vibration control device which employs inertia cancellation principles and which will function over a wide range of physical and vibratory environment. The improved vibration control device should be of reduced weight, size and complexity and should not be burdened by the limitations and disadvantages of existing vibration control devices.

DISCLOSURE OF THE INVENTION

The present invention comprises a novel vibration control device which overcomes some of the foregoing and other difficulties associated with the prior art. In accordance with the invention, there is provided a unique vibration control device of the passive spring-mass type which employs a previously unrecognized combination of hydraulics, dynamics and other arts to achieve the cancellation of unwanted oscillatory vibrations. Inertial amplification of the tuning mass is achieved by use of the laws of hydraulics instead of levers and/or beams, since with hydraulics a piston with a large area and a small displacement can move a piston with a small area through a large displcement. Also in accordance with the invention a high density, incompressible, low viscosity, high surface tension fluid is uniquely used both as the hydraulic fluid and as the tuning mass. Of particular importance, the use of this fluid excludes damping and orificing effects or any combination thereof. This tuning mass fluid produces inertial forces that are amplified hydraulically and which cancel or serve to oppose the oscillatory force transfer between a vibrating body and an isolated body. The vibration control device of the invention is particularly suited to cancelling oscillatory forces that are at substantially constant frequency. The vibration control device herein has wide application and features simple and rugged construction, smaller size, lower weight and, because of the lack of damping effects, better performance than previous devices.

In accordance with more specific aspects of the invention, there is provided a vibration isolator for connection between a vibrating body and a body to be isolated. The isolator comprises an outer housing for connection to one of the bodies, and an inner housing for connection to the other body. In addition, a spring is connected between the vibrating body and the isolated body. This spring can be either internal or external to the isolator. The inner housing functions as a piston and includes a central passage extending in the direction of the vibration to be isolated. Internal to the outer housing are spaced apart chambers interconnected by the passage within the inner housing. A tuning mass of high density incompressible fluid fills the chambers and passage. Due to the relative motions between the inner and outer housing, the fluid is hydraulicly pumped through the passage and generates amplified inertial forces on the inner and outer housing to counter the vibratory forces from the spring connecting the vibrating body to the isolated body.

BRIEF DESCRIPTION OF DRAWINGS

A more complete understanding of the invention can be had by referring to the following detailed description in conjunction with the accompanying Drawings, wherein.

DETAILED DESCRIPTION

Referring now to the Drawings, wherein like reference numerals designate like or corresponding parts throughout the several views, there is illustrated a vibration isolator embodying the present invention. The vibration isolator disclosed herein achieves improved performance while combining the advantages of simplified construction, lower weight and reduced size. The present invention can be utilized in any application wherein a reduction in vibration transmission between a vibrating body and an isolated body is desired. The vibration isolation of the present invention is particularly suited for suppressing vibratory forces producing relatively small motion at substantially constant frequency. As will be described more fully hereinafter, the vibration isolator of the invention operates on the principle of hydraulically amplified inertial forces with little or no damping action desired.

Figure 1:
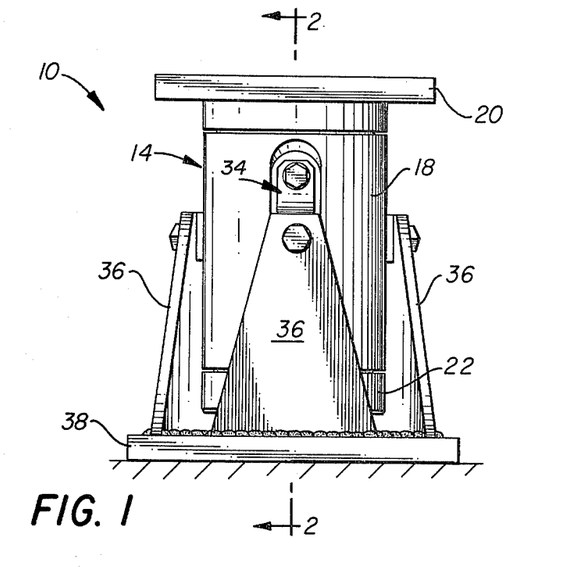
FIG. 1 is a side elevational view of a vibration isolator incorporating a first embodiment of the invention.
Figure 2:
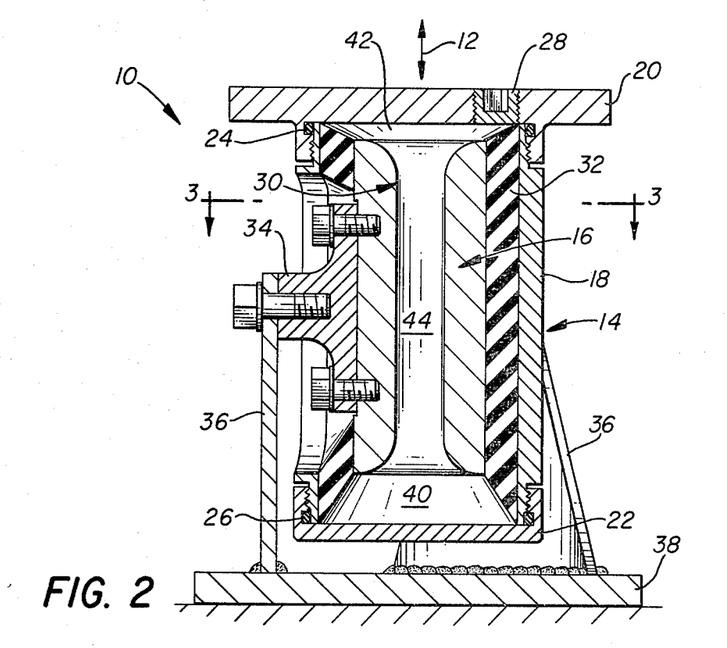
FIG. 2 is a sectional view of FIG. 1 taken along lines 2—2 in the direction of the arrows.
Figure 3:
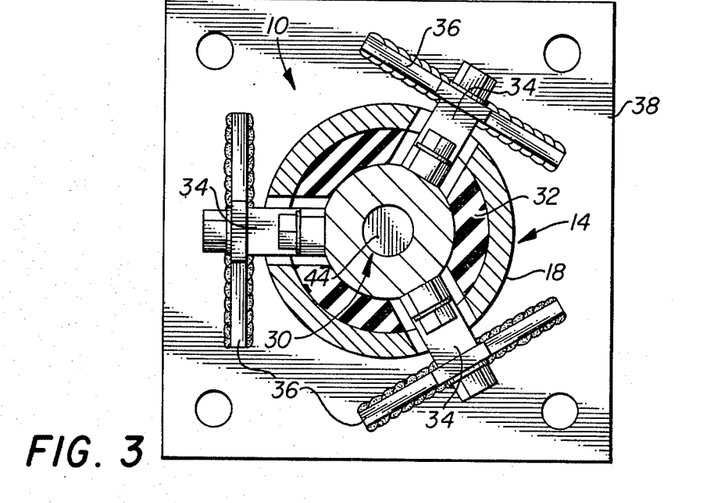
FIG. 3 is a sectional view of FIG. 2 taken along lines 3—3 in the direction of the arrows.

Referring now to FIGS. 1-3, there is shown a vibration isolator 10 incorporating a first embodiment of the invention. The isolator 10 is adapted for connection between a vibrating body oscillating along line 12, shown in FIG. 2, and a body to be isolated. The vibration isolator 10 includes a cylinder or outer housing 14 and a piston or inner housing 16. In accordance with the preferred construction, the outer housing 14 is of sectionalized construction and generally cylindrical configuration. The outer housing 14 includes a central section 18 threadedly secured to end sections 20 and 22. As is best shown in FIG. 2, seals 24 and 26 of the O-ring type are provided between the sections comprising the outer housing 14 to prevent fluid leakage from the interior thereof. It will thus be understood that outer housing 14 has a hollow interior. Preferably, a removable plug, such as plug 28 in end section 20, is provided in the housing 14 for communcation with the interior thereof.

The inner housing 16 is resiliently suspended within the outer housing 14. The inner housing 16 includes a tuning sleeve or cylinder 30 mounted for axial movement within the outer housing 14. The tuning cylinder 30 is attached to an elastomeric spring 32 bonded between the outside surface of the inner housing and the inside surface of the central section 18 in the outer housing 14. The tuning cylinder 30 is relatively shorter than the outer housing 14 to allow axial movement within the housing. The elastomeric spring 32 functions as a return spring and seal. A plurality of lugs 34 are secured directly to the inner housing 16, and extend outwardly through longitudinal openings provided in the elastomeric spring 32 and the central section 18. The lugs 34 serve as attachments for connecting the inner housing 16 either to a vibrating body or a body to be isolated from vibration. For purposes of illustration, the lugs 34 are attached to legs 36 anchored to a plate 38. The legs 36 and plate 38 thus comprise a base for attaching one of the two aforementioned bodies to the inner housing 16 of the vibration isolator 10. Although the plate 38 and thus the inner housing 16 are illustrated as connected to base or grounded structure, it will be understood that either the inner housing 16 or the outer housing 14 can be secured to a vibrating body, such that the vibration isolator 10 is reversible.

Referring particularly to FIGS. 2 and 3, two spaced apart chambers 40 and 42 are defined inside the vibration isolator 10 between the ends of the housings 14 and 16. The chambers 40 and 42 are of substantially equal cross-sectional areas but variable volume due to movement of the inner housing 16. A central passage 44 through the tuning cylinder 30 interconnects the chambers 40 and 42. The cross-sectional area of the passage 44 is relatively less than that of chambers 40 and 42. Preferably, the ends of the passage 44 in the tuning cylinder 30 are flared as shown in FIG. 2 to facilitate fluid flow through the bore and between the chambers 40 and 42 and to reduce damping.

Significantly, the chambers 40 and 42 and passage 44 in the vibration isolator 10 are filled with a liquid tuning mass. A suitable liquid comprises a dense nearly incompressible fluid with high surface tension and low viscosity. For example, liquid mercury has been found particularly effective. In this regard, it is noted that the rigid components of the vibration isolator 10 should be constructed of stainless steel, or coated by a protective coating, to resist the corrosive effect of mercury. Slurries may also be used. For example, a slurry of powdered metal and hydraulic fluid can be used.

The utilization of liquid as a tuning mass within the vibration isolator 10 is both unique and significant. For conceptual purposes, the outer housing 14 can be thought of as a cylinder, and the inner housing 16 can be likened to a piston. The application of vibrationary force to the isolator 10 causes relative motion between the piston 16 and the cylinder 14. The volumes of the chambers 40 and 42 are alternately increased and decreased as the liquid tuning mass is pumped back and forth by and through the tuning passage in the piston. However, there is substantially no orificing effect by the liquid moving through the passage 44 in the tuning cylinder 30 due to the low viscosity of the fluid. It will be understood that virtually no damping occurs as the liquid passes through the passage 44. The inertia of the tuning mass is amplified by the ratio of the cross sectional area of the piston to the cross-sectional area of the passage 44 through the piston. At some frequency, these inertial forces become equal and opposite to the force of the elastomeric spring 32 acting upon the piston, whereby cancellation occurs. The present invention thus employs acceleration of the tuning mass and displacement of the spring at the same frequency to produce forces of the same amplitude, but opposite phase, thus greatly reducing vibration.

The following analysis is set forth to facilitate understanding of the invention. Assume a system comprised of a vibrating body $M_1$ attached to end section 20 and supporting an isolated body $M_3$ attached to the plate 38 by a spring K. A tuning mass $M_2$ is enclosed in the tuning passage 44. The oscillatory or excitation force produced by the vibrating body $M_1$ can be expressed as $F \sin \omega t$, and is directed along line 12, the X coordinate. In the following equations, the subscripts refer to the body or mass of the same subscript. The prime superscripts refer to the mathematical derivative of displacement X; i.e., X' is velocity and X'' is acceleration.

Let $F_H$ equal the hydraulic force exerted on a particular body;

b equal the cross sectional area of chambers 40 and 42; and a equal the cross sectional area of tuning passage 44.

The equilibrium equations of masses $M_1$, $M_2$ and $M_3$ are:

$$M_1 X''_1 = -F_{H1} - K(X_1 - X_3) + F \sin \omega t$$

$$M_2 X''_2 = F_{H2}$$

$$M_3 X''_3 = F_{H3} + K(X_1 - X_3)$$

where K is the spring rate of the spring 32 between the vibrating body $M_1$ and the isolated body $M_3$.

By reason of constraint, due to the laws of hydraulics;

$$X_1 = (bX_3 + aX_2)/(b-a)$$

The dynamic equations for harmonic motion of the assumed system are:

$$\omega = 2\pi f$$

Displacement $x_i = X_i \sin \omega t$
Acceleration $x_i'' = -\omega^2 X_i$
where
f is the frequency of the vibration, and
$X_i$ is the amplitude of the vibration.

For displacement, the dynamics equations of masses $M_1$, $M_2$ and $M_3$ are:

$$X_2 = -F[-M_3\omega^2(b-a) - ka]/D$$

$$X_3 = F[M_2\omega^2(b/a)(b-a) - ka]/D$$

$$X_1 = (bX_3 + aX_2)/(b-a)$$

where D comprises the determinate $$\left[ \frac{-M_1\omega^2 b + ka}{(b-a)} \right] \left[ \frac{-M_1\omega a - M_2\omega^2(1/a)(b-a)^2 + ka}{(b-a)} \right]$$
$$[-M_3\omega^2(b-a) - ka][M_2\omega^2(b/a)(b-a) - ka]$$

Since for isolation to occur, no displacement of body $M_3$ is desired, the numerator of the dynamic equation for $X_3$ can be set equal to 0 and the size of $M_2$ required for cancellation of forces at the isolation frequency can be solved. The size of $M_2$ is expressed as:

$$M_2 = \frac{Ka^2}{\omega^2(b^2 - ab)}$$

Once the mass $M_2$ is determined, the length of the tuning passage 44 required (to tune the isolator to the desired frequency f) can be determined by:

$$L = \frac{M_2 \sigma}{a}$$

where $\sigma$ is equal to the density of the tuning liquid.

Since at the natural frequency the response of $M_1$ and $M_3$ becomes very large, the natural frequency can be determined by setting D equal to 0 and solving for $f_n$:

$$f_n = \left[ \frac{k(a^2)(M_1 + M_2 + M_3)}{M_1 M_2 (b^2) + M_2 M_3 (b-a)^2 + M_1 M_3 (a^2)} \right]^{\frac{1}{2}}$$

where $f_n$ is equal to the natural frequency of the system.

Figure 4:
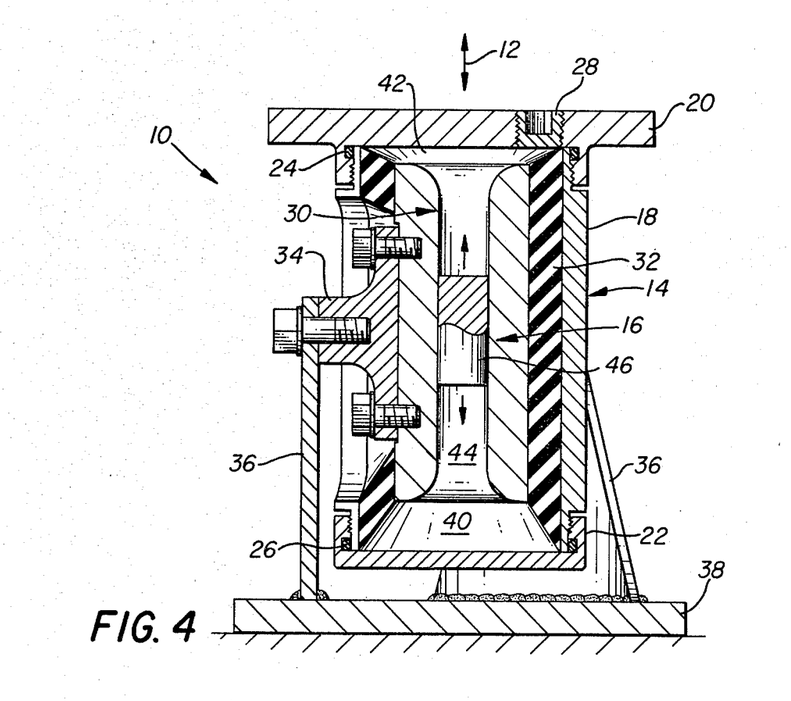
FIG. 4 is a vertical sectional view of a modification of the first embodiment of the invention.

Referring now to FIG. 4, there is shown a first modification of the vibration isolator 10. In some situations, it may be advantageous to utilize a liquid and a second piston 46 as the tuning mass in the isolator 10. The piston 46 is slidably positioned within the passage 44 in the tuning cylinder 30. Preferably, the piston 46 is comprised of heavy metal, such as tungsten. Liquid such as hydraulic fluid fills the remainder of the passage 44 as well as chambers 40 and 42. It will thus be understood that the vibration isolator functions with a combination of a solid object and liquid as the tuning mass, or functions with liquid or a liquid slurry alone as the tuning mass.

Figure 5:
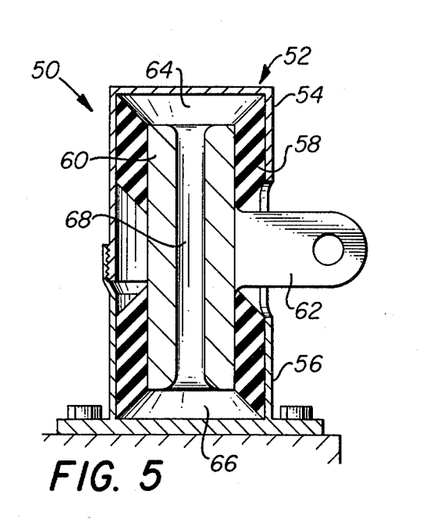
FIG. 5 is a vertical sectional view of a vibration isolator incorporating a second embodiment of the invention.

Referring to FIG. 5, there is shown a vibration isolator 50 incorporating a second embodiment of the invention. The isolator 50 includes an outer housing 52 comprised of upper section 54 and lower section 56. The outer housing 52 is preferably secured to the body to be isolated from the vibrating body. An elastomeric spring 58 is bonded between an inner housing 60 and the outer housing 52. At least one lug 62 is attached to the inner housing 60 and extends through cooperating longitudinal openings in the elastomeric spring 58 and the outer housing 52. The lug 62 is preferably connected to the vibrating body. The isolator 50 includes spaced apart chambers 64 and 66 interconnected by a passage 68 extending through the tuning cylinder 60. A tuning mass similar to that described in conjunction with the vibration isolator 10 fills chambers 64 and 66 and bore 68. Aside from the different configuration of the outer housing 52, the vibration isolator 50 functions as hereinbefore described with regard to isolator 10.

Figure 6:
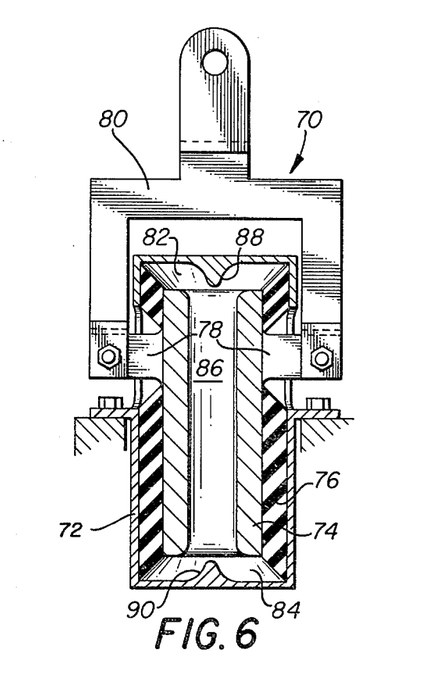
FIG. 6 is a vertical sectional view of a vibration isolator incorporating a third embodiment of the invention.

Referring to FIG. 6, there is shown a vibration isolator 70 incorporating a third embodiment of the invention. The isolator 70 includes an outer housing 72 within which an inner housing 74 is resiliently suspended by an elastomeric spring 76. At least one pair of lugs 78 extend from the inner housing 74 in opposite directions through corresponding openings in the elastomeric spring 76 and the outer housing 72. The housing 72 is preferably connected to the body to be isolated, while the lugs 78 are connected by means of a clevis 80 to the vibrating body. The vibration isolator 70 includes a pair of spaced part chambers 82 and 84 interconnected by a passage 86 extending through the inner housing 74. The isolator 70 includes conical projections 88 and 90 formed on the inside end walls of the outer housing 72 to facilitate fluid flow into and out of the chambers 82 and 84, respectively. A liquid tuning mass of the type described hereinbefore in conjunction with the isolator 10 fills the chambers 82 and 84 and the bore 86. In all other respects, the vibration isolator 70 functions as described above.

Figure 7:
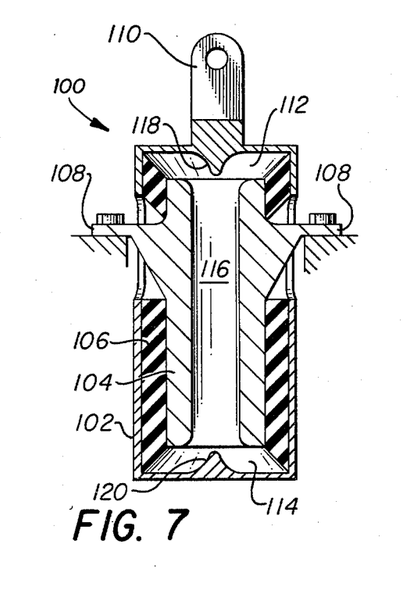
FIG. 7 is a vertical sectional view of a vibration isolator incorporating a fourth embodiment of the invention.

Referring to FIG. 7, there is shown a vibration isolator 100 incorporating a fourth embodiment of the invention. The isolator 100 includes an outer housing 102 within which an inner housing 104 is resiliently suspended by an elastomeric spring 106. The inner housing 104 includes integral lugs 108 extending outwardly from the housing 102. The lugs 108 are connected either to the vibrating body or the isolated body. The outer housing 102 includes a lug 110 which is secured to the other body. Chambers 112 and 114 are interconnected by a passage 116 extending through the inner housing 104. Conical projections 118 and 120 extend inwardly from the ends of the outer housing 102 to facilitate fluid flow into and out of the chambers 112 and 114, respectively. Chambers 112 and 114 and bore 116 are filled with a liquid tuning mass of the type hereinbefore described with regard to isolator 10. In all other respects, the vibration isolator 100 functions as described above.

Figures 8, 9:
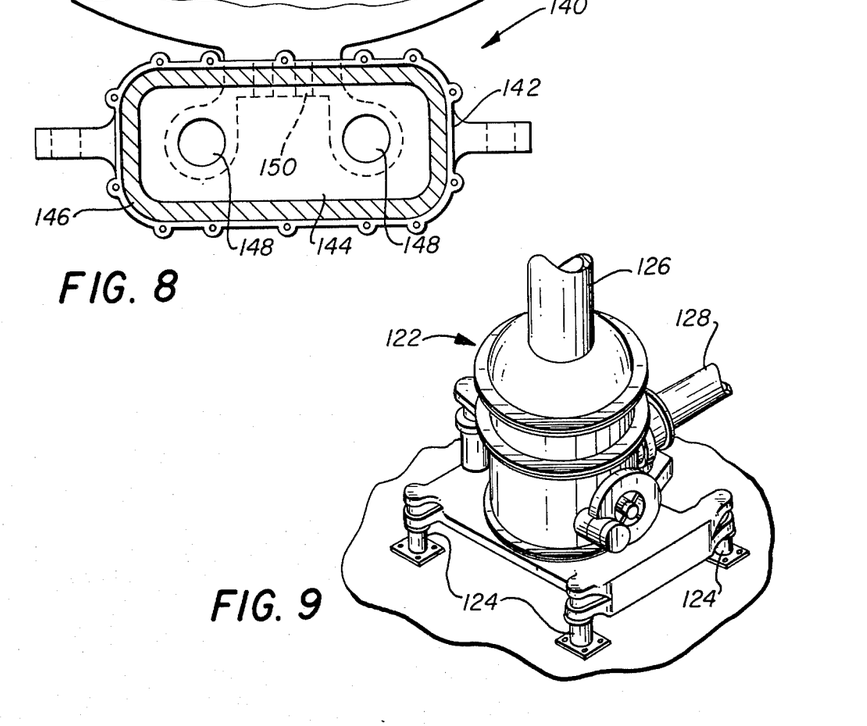
FIG. 8 is a horizontal sectional view of a vibration isolator incorporating a fifth embodiment of the invention.
FIG. 9 is an illustration of a helicopter transmission mounting utilizing a vibrating isolator of the invention.
Figure 10:
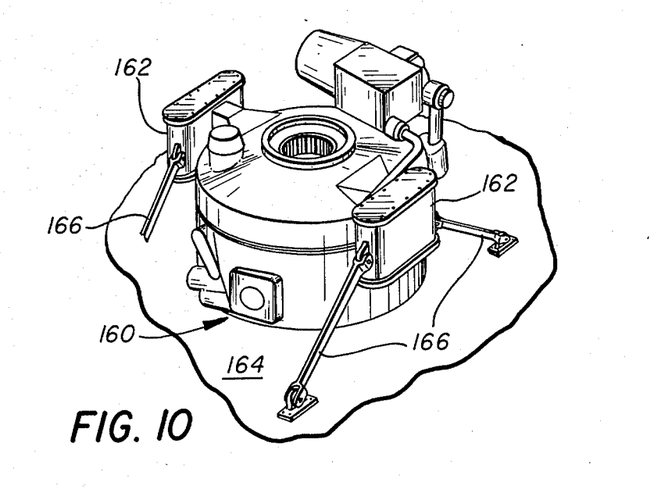
FIG. 10 is an illustration of a second helicopter transmission mounting utilizing a vibration isolator of the invention.

Referring to FIG. 8, there is shown a horizontal sectional view of a vibration isolator 140 incorporating a fifth embodiment of the invention shown installed in FIG. 10. The isolator 140 includes an outer housing 142 within which an inner housing 144 is resiliently suspended by an elastomeric spring 146. The isolator 140 is notably of a non-circular cross section and contains two tuning passages 148. The two passages 148 facilitate connection of the attachment lug 150 to the center of the inner housing 144.

In designs of this type with multiple passages the sum of the cross sectional areas of all the passages 148 is made equal to the cross sectional area of an equivalent isolator that has a single tuning passage. Thus the tuning liquid mass is the same as in the single passage unit and the isolator 140 functions the same as described before in all other aspects.

Figure 11:
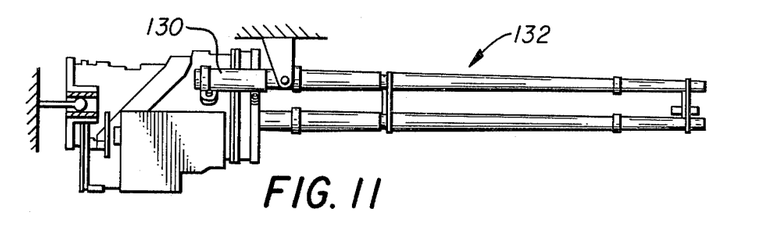
FIG. 11 is an illustration of an automatic weapon mounting utilizing a vibration isolator of the invention.
Figure 12:
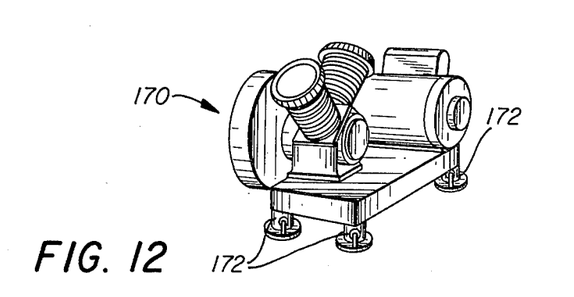
FIG. 12 is an illustration of a motor and pump unit mounting utilizing a vibration isolator of the invention.

FIGS. 9 through 12 show four installations utilizing vibration isolators constructed in accordance with the present invention. In FIG. 9 a helicopter transmission 122 is supported by four vibration isolators 124 of the present invention, only three of which are shown. The transmission 122 drives an upwardly extending mast 126 in the helicopter rotor system by means of power received through an input shaft 128. In two-bladed helicopters, a relatively strong vertical vibration occurs twice per revolution (2/rev) of the rotor blade. Since helicopters operate at substantially constant rotor speeds, the frequency of this dominant harmonic can be accurately predicted and suppressed by means of the isolators 124. In FIG. 10, a helicopter transmission 160 is supported by two vibration isolators 162 similar to the unit described in FIG. 8 of the present invention. The vibration isolators 162 are attached to the helicopter fuselage 164 by links 166. Like in FIG. 9, the vibration isolators 162 isolate the fuselage from the vertical forces produced by the revolution of the rotor blade. In FIG. 11, a pair of vibration isolators 130 are employed for supporting and suppressing recoil from an automatic gun 132. Automatic weapons operate at substantially fixed rates of fire, which makes the use of a tuned type of vibration isolator particularly attractive. In FIG. 12 a motor and compressor unit 170 is attached to four vibration isolators 172 of which only three are shown of the present invention. The vibration isolators 172 are also attached to the floor of the building in which the unit is to operate. Since the motor and compressor operate at a constant frequency the vibration isolators of the present invention can be very effective in isolating the floor from the large vibratory forces produced by the compressor. The vibration isolator of the present invention can thus be used to suppress vibration from virtually anything operating at a fixed frequency, the foregoing four examples being set forth for illustrative purposes only and not by way of limitation.

Figure 13:
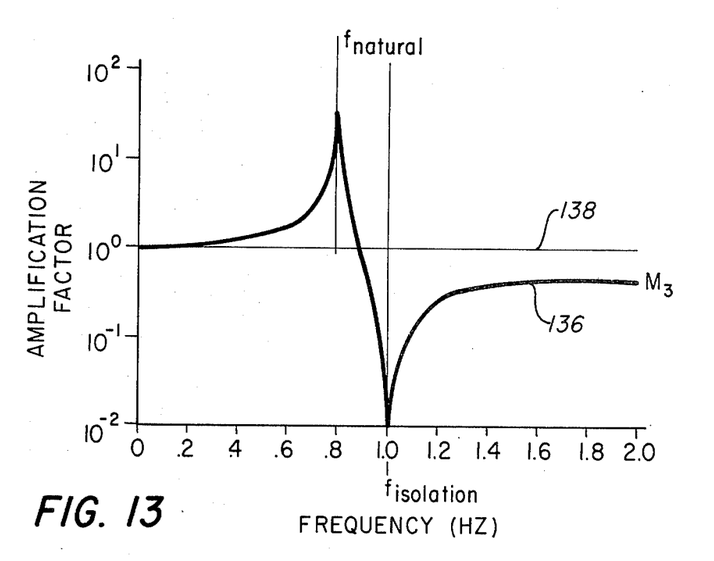
FIG. 13 is a response plot of a vibration isolator embodying the invention.

FIG. 13 shows a response plot of an isolated body attached to a vibration isolator employing a liquid tuning mass in accordance with the present invention. If a vibrating body is also attached to the vibration isolator in accordance with the present invention, and the frequency of the disturbing oscillatory force from the vibrating body is varied then line 136 represents the response of the isolated body, $M_3$. Line 138 represents the response of an equivalent rigid body. It will be observed that good isolation is achieved at the selected isolation frequency, where a sharp anti-resonance valley is located. Therefore, little oscillatory force transfer is permitted at the isolation frequency between the bodies $M_1$ and $M_3$.

From the foregoing, it will be understood that the present invention comprises a unique and novel vibration isolator incorporating numerous advantages over the prior art. A tuning mass including liquid generates amplified inertial forces for vibration cancellation. The tuning mass moves over a relatively short distance between internal, variable volume chambers, resulting in a more compact and efficient isolator. The isolator has very low damping, therefore the inertia forces can almost completely cancel the spring force with very small velocity dependent forces being generated. The isolator includes its own internal stops. Other advantages will suggest themselves to those skilled in the art.

Although particular embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and/or elements without departing from the spirit and scope of the invention.

We claim:

1. A vibration damper, comprising:
   a housing having an inner chamber;
   a piston in said housing having a cross-sectional dimension to substantially fill the inner chamber and forming spaced apart chambers on opposite ends of said piston in the housing;
   a passage extending through said piston to interconnect the spaced apart chambers;
   resilient mounting means bonded between the outside surface of said piston and the walls of the inner chamber, said mounting means forming a seal between the spaced apart chambers; and
   a tuning mass, including a liquid, substantially filling said passage and the spaced apart chambers.

2. The damper of claim 1 wherein the displacement of the piston in the housing is controlled by said resilient mounting means and said piston has a cross-sectional area larger than the piston displacement.

3. The damper of claim 1 wherein said mounting means is an elastomeric spring.

4. The damper of claim 3 wherein the parameters of the elastomeric spring and the characteristics of said tuning mass are selected such that forces produced by the elastomeric spring on the piston and the inertial forces of the tuning mass produce a cancellation of vibratory frequencies.

5. The damper of claim 3 wherein the characteristics of the tuning mass and the displacement of the elastomeric spring are selected such that acceleration of the tuning mass and displacement of the spring at substantially the same frequency produces forces of the same amplitude but opposite in phase.

6. The damper of claim 1 wherein said tuning mass includes a low viscosity fluid and substantially no orificing effect results from movement thereof through said passage.

7. The damper of claim 1, further including:
   means for securing the housing to a vibrating body; and
   means for securing the piston means to a body to be isolated from vibration.

8. The damper of claim 1, including:
   means for securing the piston means to a vibrating body; and
   means for securing the housing to a body to be isolated from vibration.

9. The damper of claim 1, wherein the liquid in said tuning mass is characterized by low viscosity, and relatively high density and surface tension.

10. The damper of claim 1, wherein said tuning mass comprises liquid mercury.

11. The damper of claim 1, wherein said tuning mass includes a rigid plug slidably disposed along the passage, with liquid filling the remainder of the passage and both chambers.

12. The damper of claim 1, wherein both chambers are of predetermined cross-sectional areas, and the passage interconnecting said chambers is of a relatively smaller predetermined cross-sectional area.

13. The damper of claim 12 wherein the ratio of the cross-sectional dimension of said piston to the cross-sectional dimension of said passage is selected to amplify the inertia of the tuning mass.

14. Apparatus for damping vibration transfer between two bodies, comprising:
   a housing connected to one of the bodies and having an elongate inner chamber;
   a piston in said housing having a cross-sectional dimension to substantially fill the inner chamber and forming spaced apart chambers on opposite ends of said piston in the housing;
   said piston including means to connect to the other one of said bodies;
   a passage extending through said piston to interconnect the spaced apart chambers;
   resilient mounting means bonded between the outside surface of said piston and the walls of the inner chamber, said mounting means forming a seal between the spaced apart chambers; and
   a tuning mass, including a liquid, substantially filling said passage and the spaced apart chambers and generating by movement of said piston amplified inertial counterforces responsive to relative motion between the housing and the piston.

15. The apparatus of claim 14 wherein the displacement of the piston in said housing is controlled by said resilient mounting means and said piston has a cross-sectional area larger than the piston displacement.

16. The apparatus of claim 14 wherein said tuning mass includes a low viscosity fluid selected to produce substantially no orificing effects by movement through said passage.

17. The apparatus of claim 14, wherein the liquid in said tuning mass is characterized by low viscosity, and relatively high density and surface tension.

18. The apparatus of claim 14, wherein said tuning mass comprises liquid mercury.

19. The apparatus of claim 1 or 14, wherein said tuning mass comprises a slurry of powdered metal in hydraulic fluid.

20. The apparatus of claim 14, wherein said tuning mass includes a rigid plug slidably disposed along the passage, with liquid filling the remainder of the passage and both chambers.

* * * * *